United States Patent
Ganesan et al.

(10) Patent No.: US 9,658,914 B2
(45) Date of Patent: *May 23, 2017

(54) TROUBLESHOOTING SYSTEM USING DEVICE SNAPSHOTS

(71) Applicant: Dell Products L.P., Round Rock, TX (US)

(72) Inventors: Vaideeswaran Ganesan, Bangalore (IN); Anirban Kundu, Kolkata (IN); Anitha Subramonia Iyer, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 14/323,805

(22) Filed: Jul. 3, 2014

(65) Prior Publication Data
US 2014/0325286 A1    Oct. 30, 2014

Related U.S. Application Data

(63) Continuation of application No. 13/284,625, filed on Oct. 28, 2011, now Pat. No. 8,782,472.

(51) Int. Cl.
G06F 11/00 (2006.01)
G06F 11/07 (2006.01)

(52) U.S. Cl.
CPC ...... *G06F 11/0778* (2013.01); *G06F 11/0748* (2013.01); *G06F 11/0769* (2013.01); *G06F 11/0775* (2013.01); *G06F 11/079* (2013.01)

(58) Field of Classification Search
CPC ............ G06F 11/0769; G06F 11/0775; G06F 11/0778; G06F 11/0784; G06F 11/079; G06F 11/0748; G06F 11/2294; G06F 2009/45591; H04L 67/025
See application file for complete search history.

(56) References Cited

U.S. PATENT DOCUMENTS

| | | | |
|---|---|---|---|
| 5,388,252 A * | 2/1995 | Dreste | G06F 11/2294 714/46 |
| 6,298,457 B1 * | 10/2001 | Rachlin | G06F 11/0748 714/12 |
| 6,601,190 B1 * | 7/2003 | Meyer | G06F 11/006 714/27 |

(Continued)

*Primary Examiner* — Marc Duncan
(74) *Attorney, Agent, or Firm* — Haynes and Boone, LLP (57) ABSTRACT

An information handling system (IHS) troubleshooting system includes a customer IHS including a plurality of components. A customer management system in the customer IHS detects a failure in a managed system and, in response, immediately triggers a device snapshot of the customer IHS. At least one managed system in the customer IHS includes a device snapshot engine that, in response to the customer management system triggering the device snapshot of the customer IHS, immediately create the device snapshot of the customer IHS. A device snapshot storage in the customer IHS stores the device snapshot of the customer IHS. A snapshot communication engine in the customer IHS sends the device snapshot of the customer IHS over the network to a support IHS. The support IHS may load the device snapshot into a virtual IHS and manage the virtual IHS to replicate the failure detected in the managed system for troubleshooting.

20 Claims, 9 Drawing Sheets

(56) References Cited

U.S. PATENT DOCUMENTS

| | | | |
|---|---|---|---|
| 7,379,849 B2 | 5/2008 | Shrivastava et al. | |
| 7,913,115 B1 * | 3/2011 | Powers | G06F 11/0748 714/18 |
| 8,145,942 B2 * | 3/2012 | Nguyen | G06F 11/079 714/38.14 |
| 8,381,014 B2 * | 2/2013 | Abdul | G06F 11/0709 714/11 |
| 8,381,035 B2 | 2/2013 | Saito | |
| 8,762,790 B2 * | 6/2014 | McCoy | G06F 11/079 714/38.1 |
| 2002/0087950 A1 | 7/2002 | Brodeur et al. | |
| 2002/0152430 A1 | 10/2002 | Akasaka | |
| 2004/0078683 A1 | 4/2004 | Buia et al. | |
| 2004/0172574 A1 | 9/2004 | Wing et al. | |
| 2004/0236820 A1 * | 11/2004 | Flocken | G06F 11/0709 709/200 |
| 2005/0261879 A1 * | 11/2005 | Shrivastava | G06F 11/0715 702/186 |
| 2006/0085792 A1 * | 4/2006 | Traut | G06F 11/1438 718/100 |
| 2006/0112061 A1 | 5/2006 | Masurkar | |
| 2006/0168471 A1 * | 7/2006 | Schulstad | G06F 11/0727 714/6.11 |
| 2006/0195731 A1 * | 8/2006 | Patterson | G06F 11/0778 714/723 |
| 2007/0067754 A1 * | 3/2007 | Chen | G06F 11/0778 717/127 |
| 2008/0126887 A1 | 5/2008 | Brodeur et al. | |
| 2008/0148129 A1 | 6/2008 | Moon et al. | |
| 2008/0155216 A1 | 6/2008 | Shoham | |
| 2008/0209415 A1 * | 8/2008 | Van Riel | G06F 9/45533 718/1 |
| 2008/0222456 A1 * | 9/2008 | Jones | G06F 11/0709 714/45 |
| 2009/0055822 A1 * | 2/2009 | Tolman | G06F 8/60 718/1 |
| 2009/0119493 A1 * | 5/2009 | Venkitachalam | G06F 11/3636 712/238 |
| 2009/0150909 A1 | 6/2009 | Barreto et al. | |
| 2009/0296718 A1 | 12/2009 | Gefflaut et al. | |
| 2009/0319248 A1 | 12/2009 | White et al. | |
| 2009/0319647 A1 | 12/2009 | White et al. | |
| 2010/0100778 A1 | 4/2010 | Sullivan | |
| 2010/0146620 A1 | 6/2010 | Simeral et al. | |
| 2010/0229022 A1 | 9/2010 | Anand et al. | |
| 2011/0239052 A1 * | 9/2011 | Nguyen | G06F 11/079 714/37 |
| 2011/0264960 A1 | 10/2011 | Cho | |
| 2012/0144236 A1 * | 6/2012 | Black | H04L 43/50 714/25 |
| 2012/0167044 A1 * | 6/2012 | Fortier | G06F 9/455 717/121 |
| 2013/0139128 A1 * | 5/2013 | Jones | G06F 11/3664 717/128 |
| 2016/0239377 A1 * | 8/2016 | Hooks | G06F 11/0748 |

\* cited by examiner

TROUBLESHOOTING SYSTEM USING DEVICE SNAPSHOTS

CROSS-REFERENCE TO RELATED APPLICATIONS

This application is a Continuation of U.S. patent application Ser. No. 13/284,625 filed on Oct. 28, 2011, entitled "Troubleshooting System Using Device Snapshots," the disclosure of which is incorporated herein by reference.

BACKGROUND

The present disclosure relates generally to information handling systems (IHSs), and more particularly to system for troubleshooting IHSs using device snapshots.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHS users contract with support providers such that when there is a problem with their IHS, the support provider provides remote support to fix the problem with the IHS. The provision of remote support can raise a number of issues. For some problems, support providers will physically reproduce the IHS situation that caused the problem to allow troubleshooting of that problem in order to solve it. However, some IHS situations may be very difficult to physically reproduce, and in some cases the problem occurring in the user IHS may never materialize even when the IHS situation is physically reproduced. For example, the problem of IHSs in a datacenter intermittently moving into an unmanaged state has been found to not materialize even when the IHS situation was physically reproduced. In another example, the problem of script failures for fan modules in IHSs materialized only once in two weeks of physically reproducing the IHS situation. In yet another example, the problem of IHSs reporting certain volumes of storage devices as critical even when those volumes were not critical only materialized when the IHS situation, including over 200 hard disks and over 60 volumes, was physically reproduced, an IHS physical reproduction that required two weeks of time to accomplish. As should be appreciated, such physically reproductions are time-consuming and expensive to provide to attempt to solve a users IHS problem, particularly when the problem does not materialize upon the physical reproduction the IHS situation and thus cannot be solved remotely.

Accordingly, it would be desirable to provide an improved troubleshooting system.

SUMMARY

According to one embodiment, an information handling system (IHS) troubleshooting system includes a customer IHS that is operable to be coupled to a network, wherein the customer IHS includes: a customer management system that is operable to detect a failure in a managed system and, in response, immediately trigger a device snapshot of the customer IHS; at least one managed system including a device snapshot engine that is operable, in response to the customer management system triggering the device snapshot of the customer IHS, to immediately create the device snapshot of the customer IHS; a device snapshot storage that is operable to store the device snapshot of the customer IHS; and a snapshot communication engine that is operable to send the device snapshot of the customer IHS over the network to a support IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
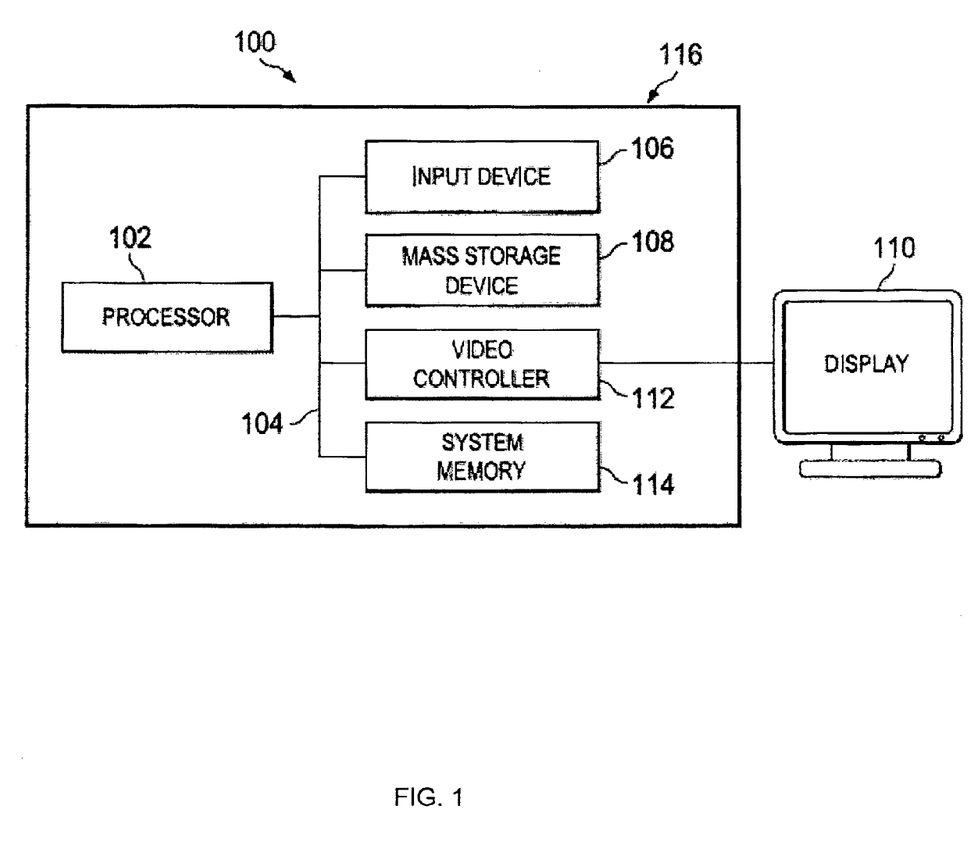
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
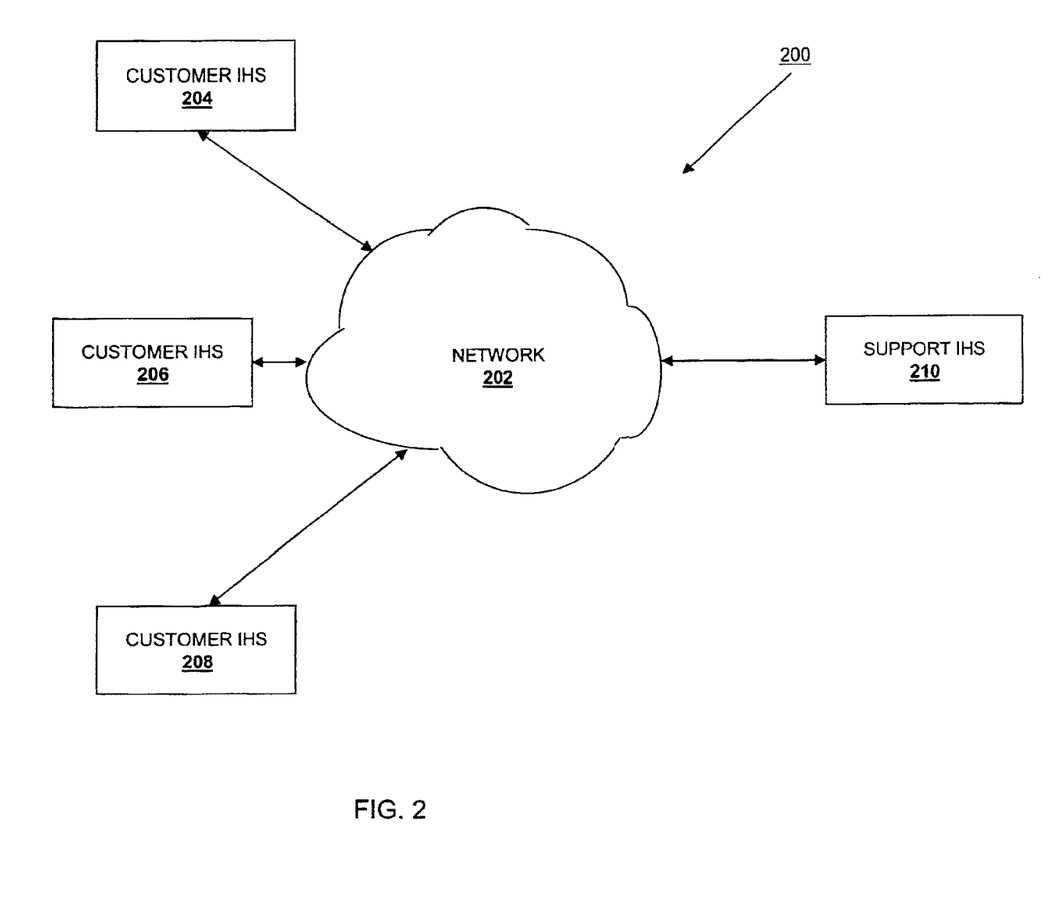
FIG. 2 is a schematic view illustrating an embodiment of an IHS troubleshooting system.

Referring now to FIG. 2, an IHS troubleshooting system 200 is illustrated. The IHS troubleshooting system 200 includes a network 202 that couples a plurality of customer IHSs 204, 206, and 208 to a support IHS 210. In an embodiment, the customer IHSs 204, 206, and 208 and/or the support IHS 210 may be the IHS 100, described above with reference to FIG. 1, and may include some or all of the components of the IHS 100. The network 202 may be a intranet, the Internet, and/or a variety of other networks known in the art. While three customers IHSs are illustrated coupled a single support IHS, one of skill in the art will recognize that any number of customer IHSs may be coupled to any number of support IHSs through the network 202 while remaining within the scope of the present disclosure.

Figure 3:
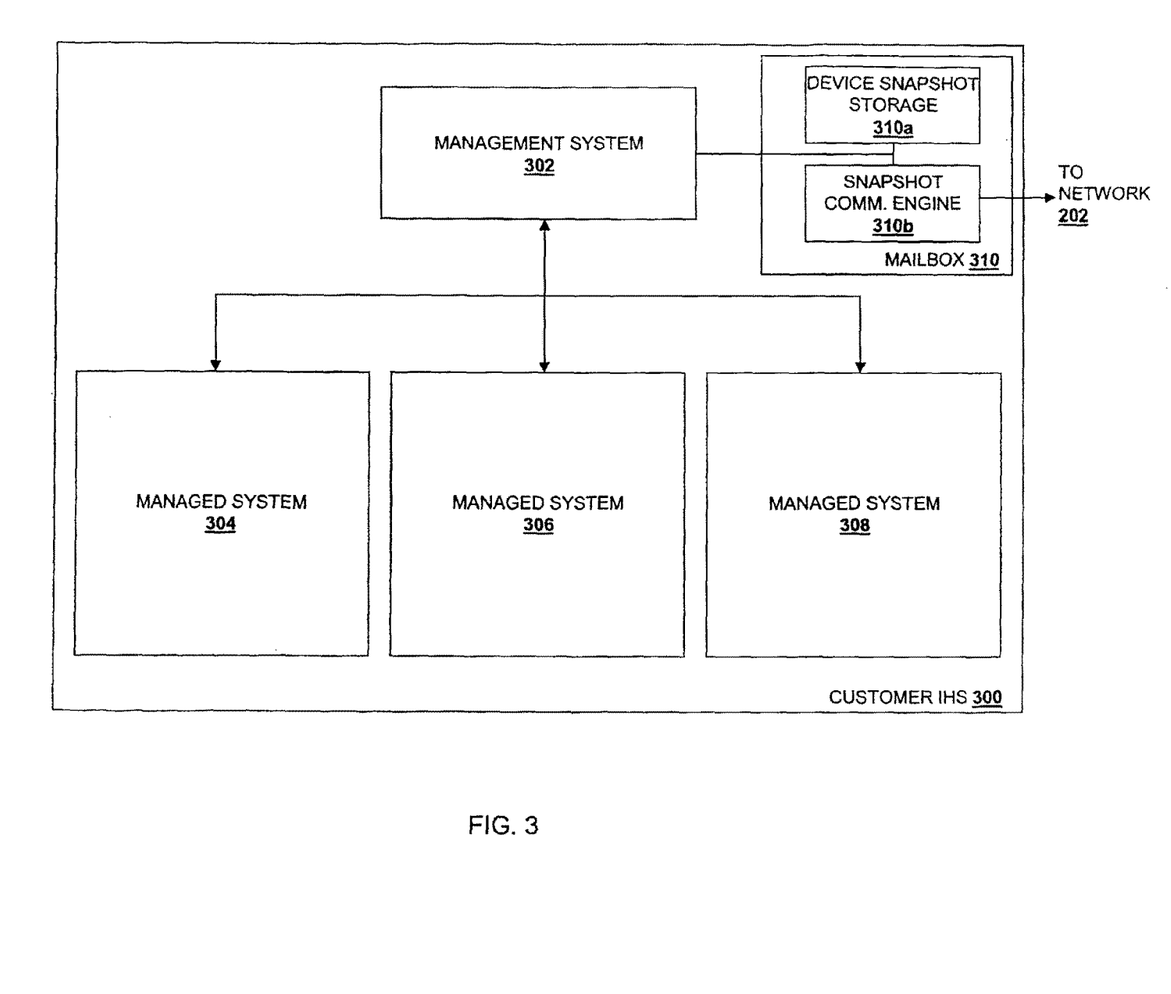
FIG. 3 is a schematic view illustrating an embodiment of a customer IHS used in the IHS troubleshooting system of FIG. 2.

Referring now to FIG. 3, a customer IHS 300 is illustrated. In an embodiment, the customer IHS 300 may be the IHS 100, discussed above with reference to FIG. 1, and/or the customer IHSs 204, 206, and/or 208, discussed above with reference to FIG. 2. The customer IHS 300 includes a management system 302 that is coupled to a plurality of managed systems 304, 306, and 308. While three managed systems are illustrated, one of skill in the art will recognize that any number of managed systems will fall within the scope of the present disclosure. The management system 302 is also coupled to a mailbox 310 that includes a device snapshot storage 310a and a snapshot communication engine 310b. The snapshot communication engine 310b is coupled to the network 202 using methods known in the art. In an embodiment, the mailbox 310 is an administrator mailbox accessible by an administrator of the customer IHS 300 through one or more access devices coupled to the customer IHS 300. In an embodiment, the management system 302 is a management server that includes a system center operation manager (SCOM) that is operable to monitor applications and hardware devices. In an embodiment, the SCOM includes a cross platform data center management server for operating systems, hypervisors, and/or other systems known in the art, and may utilize an interface displaying state, health, and performance information of the managed systems 304, 306, and 308. The SCOM is operable to provide alerts generated according to some availability, performance, configuration, security situation, and/or other event identified in the managed systems 304, 306, and 308.

In an embodiment, the managed systems 304, 306, and 308 may be servers, clients, Modular Disk (MD) arrays, storage systems, chassis management controllers (CMCs), remote access controllers (RACs), printers, and/or variety of other managed systems known in the art. In an embodiment, the SCOM on the management system 302 is operable to monitor the managed systems 304, 306, and 308 by pushing agents onto the managed systems 304, 306, and 308 and collecting monitoring data from those agents. In an embodiment, an agent on a managed system may watch one or more sources on that managed system (e.g., an event log such as, for example, a Windows® event log) for specific events or alerts generated by the applications executing on that managed system. Upon alert occurrence or detection, the agent is operable to forward the alert to the SCOM, which may maintain a database that includes a history of the alerts. The SCOM on the management system 302 may also be operable to execute scripts on the management server 302 that connect to the managed systems 304, 306, and 308 and pull the monitoring data from the managed systems 304, 306, and 308. For example, the SCOM may monitor storage servers, remote access controllers, printer hardware, and/or a variety of other monitored systems known in the art, by executing instrumentation scripts on the management system 302. In an embodiment, the management system 302 or a device connected to the management system 302 allows monitoring data to be viewed by a user in various formats (e.g., using the display 110, described above with reference to FIG. 1).

In an embodiment, the SCOM is operable to apply filtering rules to the alerts as they are received or retrieved, and those rules may trigger a notification (e.g., an email), generate a network support ticket, and/or trigger some other workflow known in the art that maybe used in correcting the cause of the alert. A set of filtering rules specific to a monitored application may be referred to as a management pack. For example, a management pack may include instrumentation scripts that discover, classify, and/or create detailed device inventories and/or monitor device health. Management packs may also monitor software/device components. In an embodiment, separate management packs for managing servers, laptops, desktops, storage, printers, and/or other network devices may be provided. Instrumentation scripts on these management packs may then run periodically such that the management system 302 may build a complete view of the managed systems 304, 306, and 308 using the collected information. A troubleshooting management pack, described in further detail below, is included in the management system 302. Furthermore, some or all of the managed systems 304, 306, and 308 may include management packs, and the management system 302 may include management packs in addition to the troubleshooting management pack. For example, the managed systems 304, 306, and 308 may include server management packs, printer management packs, storage management packs, and/or a variety of other management packs known in the art. In an embodiment, management packs on the managed systems 304, 306, and 308 may provide one or more device snapshot engines on the managed systems that include instructions that are stored on a non-transitory, computer-readable medium and that, when executed by a processor, are operable to create a device snapshot of the customer IHS, as discussed in further detail below.

Figure 4:
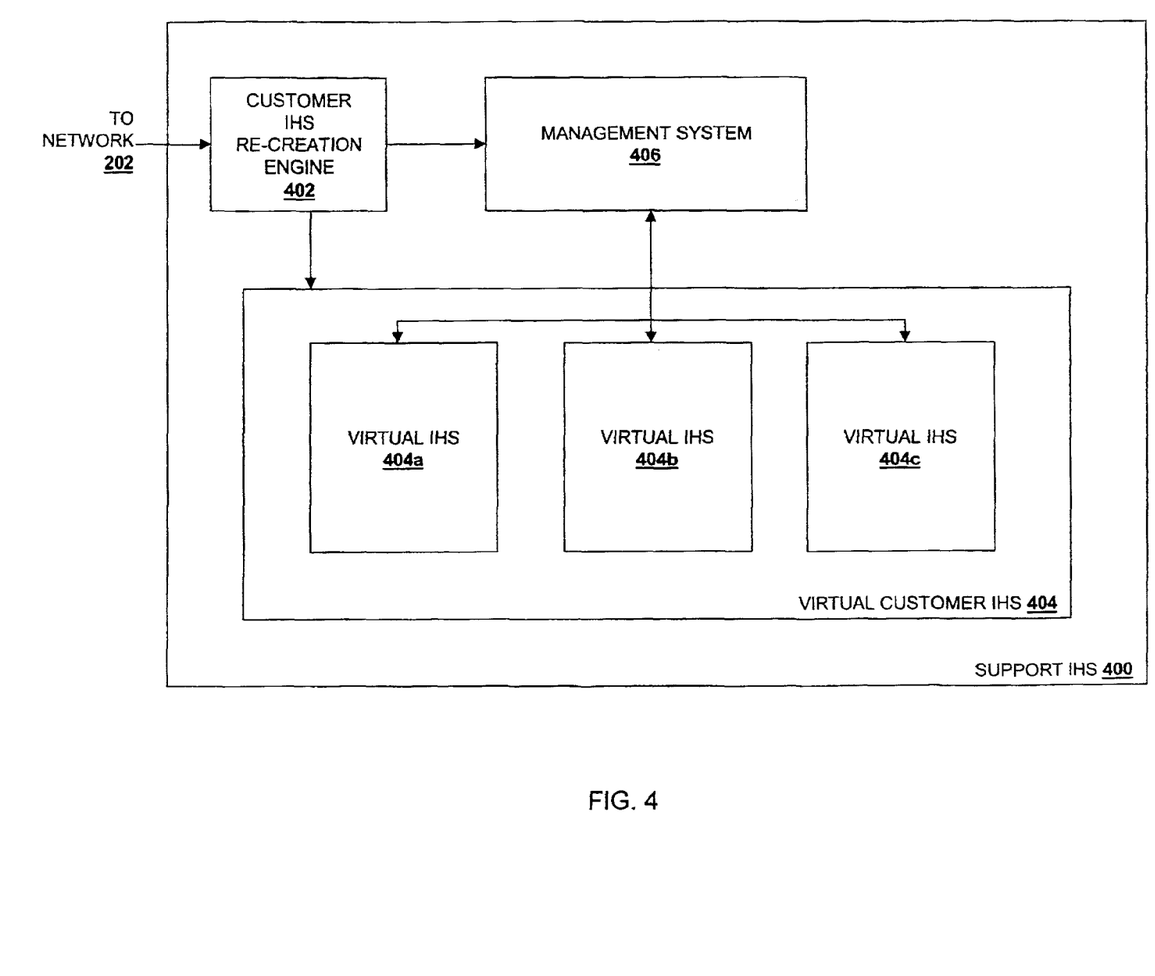
FIG. 4 is a schematic view illustrating an embodiment of a support IHS used in the IHS troubleshooting system of FIG. 2

Referring now to FIG. 4, a support IHS 400 is illustrated. In an embodiment, the support IHS 400 may be the IHS 100, discussed above with reference to FIG. 1, and/or the support IHS 210, discussed above with reference to FIG. 2. The support IHS 400 includes a customer IHS re-creation engine 402 that includes instructions that are stored on a non-transitory, computer-readable medium (e.g., the system memory 114 described above with reference to FIG. 1, the mass storage device 108 described above with reference to FIG. 1, and/or other computer-readable media known in the art) and that, when executed by a processor, cause the processor to perform a number of operations that are discussed in further detail below. The customer IHS re-creation engine 402 is coupled to the network 202. As discussed in further detail below, the customer IHS re-creation engine 402 is operable to create a virtual customer IHS 404 that may include a plurality of virtual IHSs 404a, 404b, and 404c corresponding to the managed system 302, 304, and 306. In an embodiment, the customer IHS re-creation engine 402 is also operable to create a virtual management system 406 that is coupled to the virtual customer IHS 404. In another embodiment, the management system 406 may be a physical IHS that is coupled to the virtual customer IHS 404.

Figure 5:
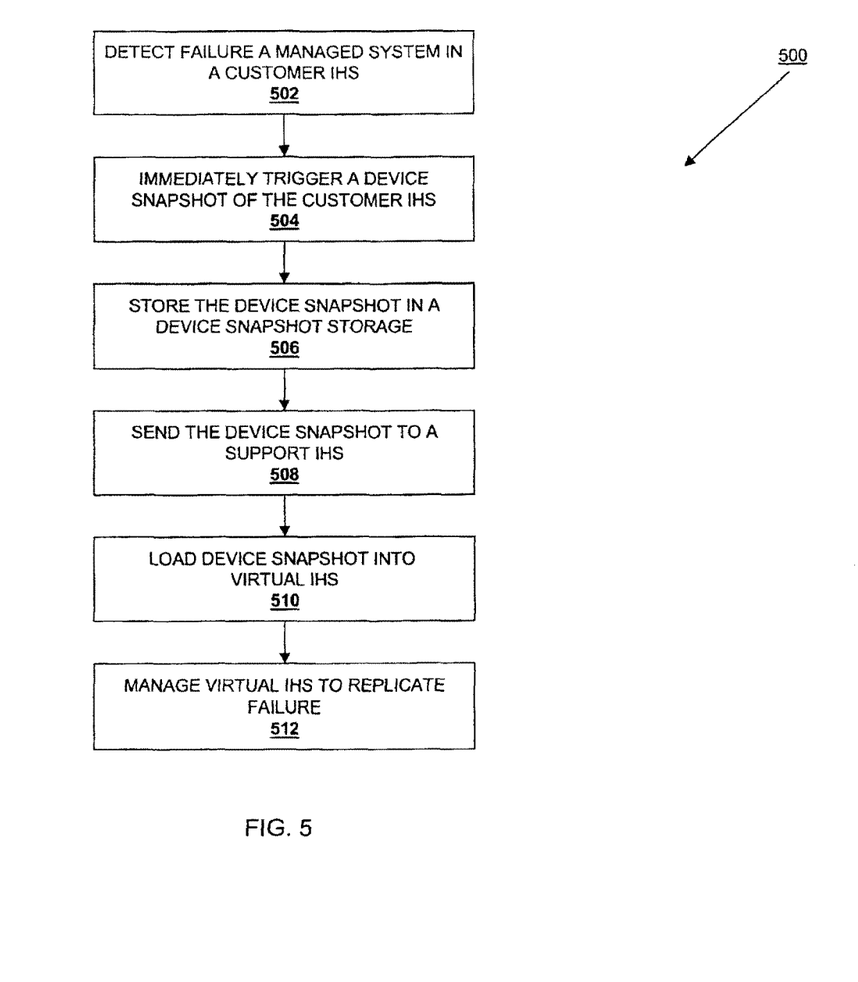
FIG. 5 is a flow chart illustrating a method for troubleshooting an IHS.
Figure 6:
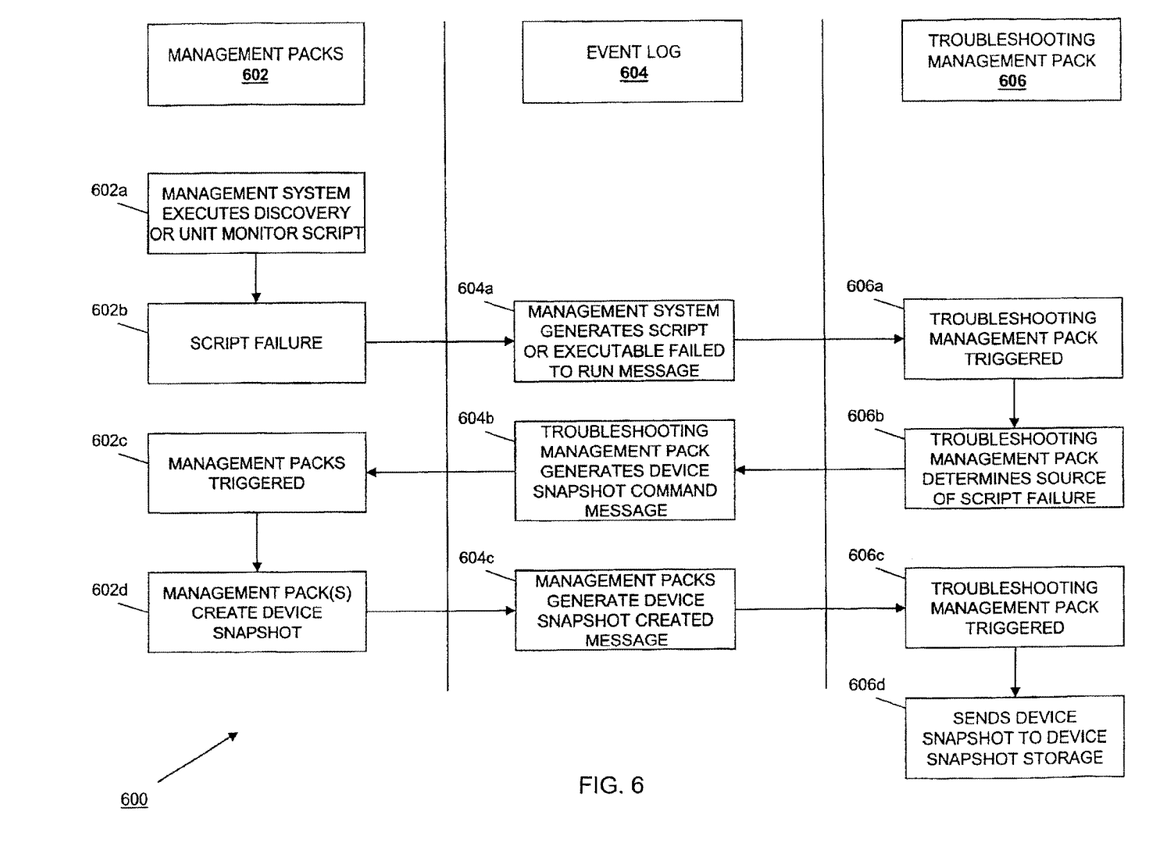
FIG. 6 is a use case illustrating an embodiment of a portion of the method of FIG. 5.

Referring now to FIGS. 3, 4, 5 and 6, a method 500 for troubleshooting an IHS is illustrated. FIG. 6 illustrates a use case 600 that breaks the method 500 up into functionality that is carried out using management packs 602 on the management system 302 and managed systems 304, 306, and 308 on the customer IHS 300, an event log 604 (e.g., a Windows® event log) on the customer IHS 300, and a troubleshooting management pack 606 on the management system 302 in the customer IHS 300, in blocks 502, 504, and 506 of the method 500. The method 500 begins at block 502 where a failure is detected in a managed system in a customer IHS. The SCOM on the management system 302 in the customer IHS 300 may execute management pack instrumentation scripts and, in an embodiment, a script may fail or abruptly terminate. For example, the SCOM may execute discovery, a unit monitor script, and/or other executables known in the art, at block 602a, and at block 602b the script fails.

The method 500 then proceeds to block 504 where a device snapshot of the customer IHS is immediately triggered. In response to the script failure at block 602b, the management system 302 may detect the script failure and generate a script or executable "failed to run" message in the event log 604 at block 604a. For example, the SCOM may generate a Windows® log event that indicates the context of the failure by including a description of the failure (e.g., "Script or Executable Failed to Run"), a log of the failure (e.g., "Operations Manager"), an event source (e.g., "Services Module"), and an Event (e.g., "21405/21406"). In an embodiment, the script may have failed due to a variety of reasons know in the art such as, for example, errors in the management instrumentation objects, unexpected values, script errors, etc.

The script or executable "failed to run" message in the event log 604 triggers the troubleshooting management pack in the management server 302 at block 606a, and the troubleshooting management pack determines the source of the script failure at block 606b. In an embodiment, the source of the script failure may be software and/or a driver running on a managed system in the network (that is managed by the SCOM), another management pack, and/or a variety of other script failure sources known in the art. The troubleshooting management pack may determine the source of a script failure by parsing through events that are logged into an event log on the managed system 302. Upon determining the source of the script failure, the troubleshooting management pack generates a device snapshot command message in the event log 604 at block 604b, which triggers one or more management packs at block 602c. In an embodiment, the management pack in the managed system that was determined to be the source of the script failure at block 606b is triggered at block 602c. In another embodiment, a plurality or all of the management packs in the managed systems 304, 306, and 308 are triggered at block 602c. For example, a device snapshot may be triggered for the software/driver components on the managed systems that report a script failure, and because those components are monitored by management packs, all relevant management packs monitoring those software/driver components on the managed systems are triggered. At block 602d, the managed system(s) triggered at block 602c operate to create a device snapshot for the customer IHS 300. As discussed above, the management packs provide device snapshot engines that are operable to create a device snapshot for customer IHS 300. In an embodiment, block 504 of the method 500 is performed such that device snapshot engine(s) create the device snapshot of the customer IHS 300 at block 602d within 5 seconds of the script failure being detected at block 602b. Thus, the 'immediate' triggering of the device snapshot of the customer IHS 300 at block 504 of the method 500 causes the device snapshot of the customer IHS 300 to be created within a few seconds of the detected failure which, in experimental embodiments, has been found to provide a device snapshot of the customer IHS 300 that may be used to replicate the exact configuration of the customer IHS 300 at the moment the failure occurred, discussed in further detail below.

Figure 7:
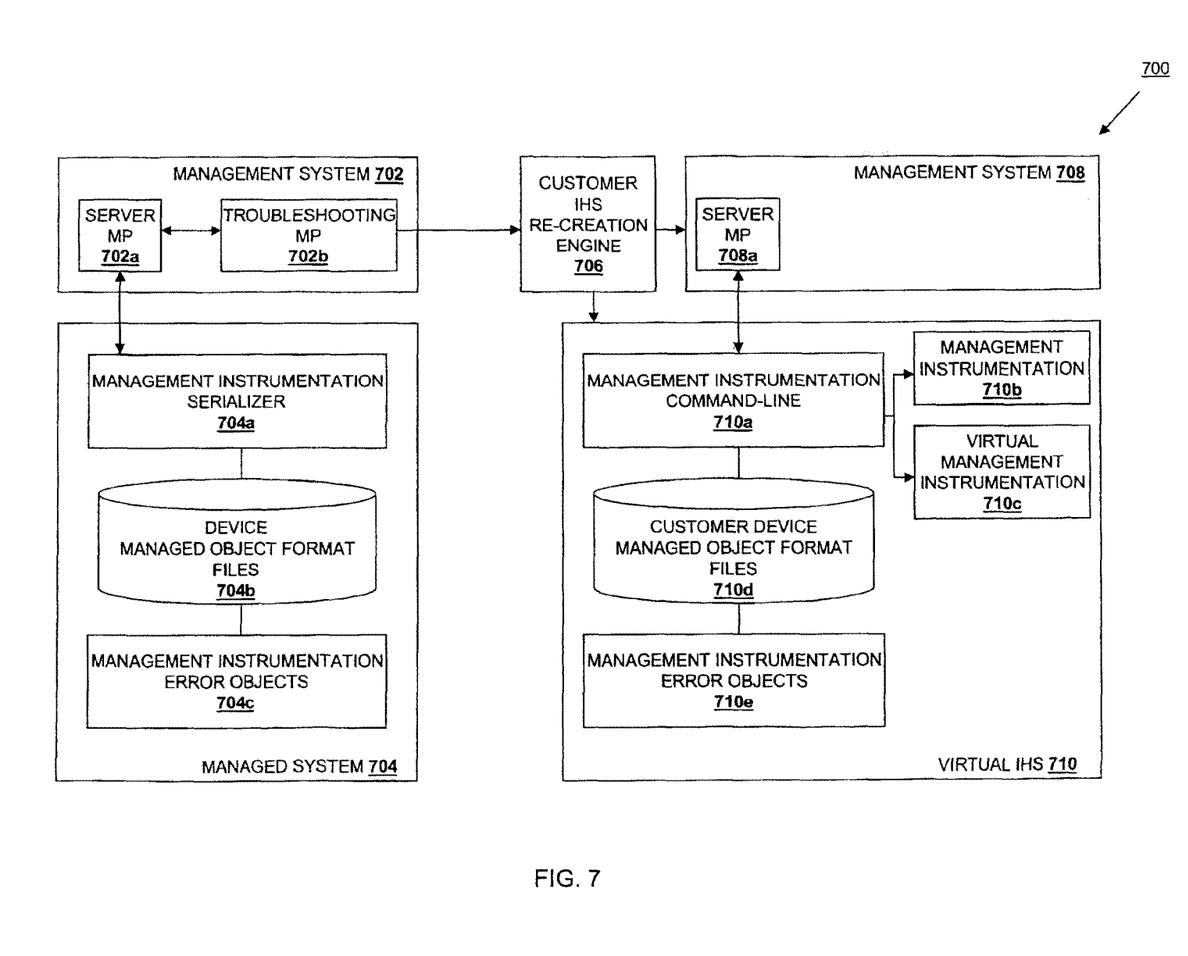
FIG. 7 is a schematic view illustrating an embodiment of an IHS troubleshooting system.

In one example, referring now to FIGS. 3 and 7, a device snapshot may be taken by an IHS troubleshooting system 700. The IHS troubleshooting system 700 includes a customer IHS management system 702 coupled to a customer IHS managed system 704 and a support IHS customer IHS re-creation engine 706. In an embodiment, the customer IHS management system 702 may be the management system 302 in the customer IHS 300, described above with reference to FIG. 3, and the customer IHS managed system 704 may be one of the managed systems 304, 306, and 308 in the customer IHS 300, described above with reference to FIG. 3. In an embodiment, the troubleshooting system 700 may be used when the managed systems 304, 306, and 308 in the customer IHS 300 include servers, clients, and/or a variety of other IHSs known in the art. The customer IHS management system 702 includes a server management pack 702a and a troubleshooting management pack 702b. The customer IHS managed system 704 includes a management instrumentation serializer 704a (e.g., a Windows® management instrumentation (WMI) serializer), a device managed object format (MOF) files database 704b, and a management instrumentation error objects database 704c (e.g., a Windows® management instrumentation (WMI) error objects database). At block 504 of the method 500, a management pack in the managed system 704 may cause the management instrumentation serializer 704a to create the device snapshot by capturing the management instrumentation state (e.g., the Windows® management instrumentation state) from the device MOF files in the database 704b and/or the management instrumentation error objects in the database 704c. For example, the management instrumentation serializer 704a may use a management instrumentation interface to query a device for all management instrumentation objects on the device that include data pertaining to inventory information and health state of the device. The management instrumentation serializer will serialize all the inventory and health data into a device snapshot file that captures the state of the management instrumentation objects, the health of the management instrumentation objects, MOF files in the database, and error objects in a standardized formatting language (e.g., Extensible Markup Language (XML)) such that the device snapshop file format may be recognized by both the serializer and a deserializer.

Figure 8:
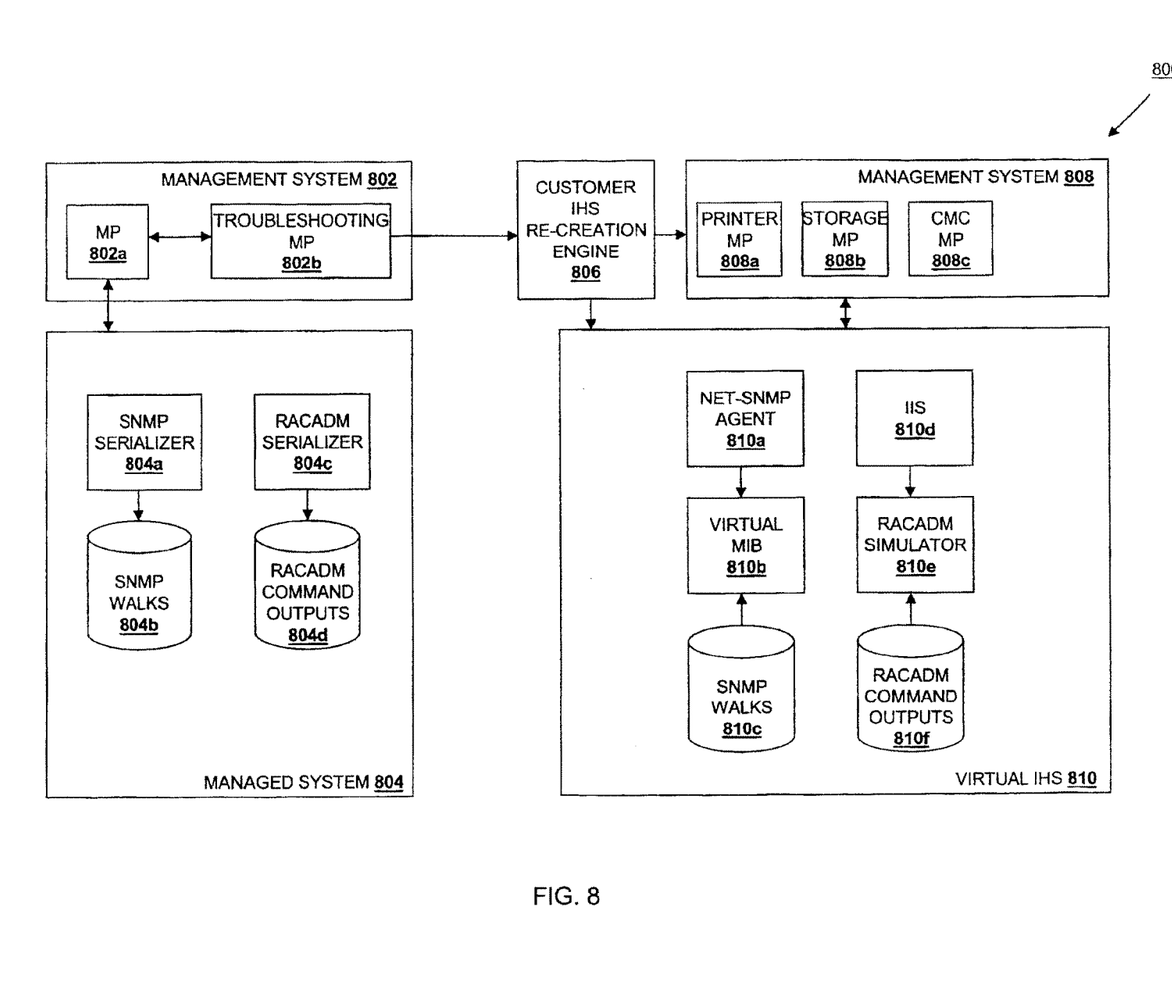
FIG. 8 is a schematic view illustrating an embodiment of an IHS troubleshooting system.

In another example, referring now to FIGS. 3 and 8, a device snapshot may be taken by an IHS troubleshooting system 800. The IHS troubleshooting system 800 includes a customer IHS management system 802 coupled to a customer IHS managed system 804 and a support IHS customer IHS re-creation engine 806. In an embodiment, the customer IHS management system 802 may be the management system 302 in the customer IHS 300, described above with reference to FIG. 3, and the customer IHS managed system 804 may be one of the managed systems 304, 306, and 308 in the customer IHS 300, described above with reference to FIG. 3. In an embodiment, the troubleshooting system 800 may be used when the managed systems 304, 306, and 308 in the customer IHS 300 include storage servers, chassis management controllers (CMCs) remote access controllers (RACs), printers, and/or a variety of other systems known in the art. The customer IHS management system 802 includes a management pack 802a and a troubleshooting management pack 802b. The customer IHS managed system 804 includes a simple network management protocol (SNMP) serializer 804a coupled to an SNMP walks database 804b, and a Remote Access Controller Administration (RA-CADM) serializer 804c coupled to an RACADM command outputs database 804d. In an embodiment, at block 504 of the method 500, a management pack in the managed system 804 may cause the SNMP serializer 804a to create the device snapshot by generating SNMP walks in the SNMP walks database 804b for use in capturing the state of the managed system 704. The SNMP Serializer uses SNMP Walk Requests to query the device for all SNMP objects on the device containing data pertaining to the inventory information and health state for the device. The SNMP Serializer will serialize all the inventory and health data into a device snapshot file that captures the states of the SNMP objects, the ehealth of the SNMP objects, and error objects in a standardized formatting language (e.g., XML) such that the device snapshot file format is recognize by both the serializer and a deserializer. In an embodiment, at block 504 of the method 500, a management pack in the managed system 804 may cause the RACADM serializer 804c to create the device snapshot by saving the state of all commands in the RACADM command outputs database 804d for use in replicating the state of the managed system 704. The RACADM Serializer will query all the objects supported by the RACADM utility by running all supported RACADM commands and saving the output of the commands into a file using a standardized formatting language (e.g., XML.) In an unillustrated example, the device snapshot may be created for Modular Disk (MD) arrays using an Array Bridge Broker (ABB) toolkit in simulation mode to capture and/or simulate the state of the managed system. For example, the troubleshooting management pack may run the ABB toolkit in simulation mode when a failure is encountered in the MD array, which results in the creation of a device snapshot file where the MD array objects that contain all the inventory and health state data for the device are saved into a file using a standardized formatting language (e.g., XML). The device may then be replicated by running the ABB toolkit in simulation mode, which results in the deserializer module in the ABB toolkit reading the inventory and failure files, allowing the ABB to generate all the data needed by the MD array management pack to recreate the exact customer device state.

The method 500 then proceeds to block 506 where the device snapshot is stored in a device snapshot storage. After creating the device snapshot at block 602d, the management pack(s) in the managed system(s) generate a "device snapshot created" message in the event log 604 at block 604c. The "device snapshot created" message in the event log 604 triggers the troubleshooting management pack in the management server 302 at block 606c, and the troubleshooting management pack sends the device snapshot to a device snapshot storage at block 606d. In an embodiment, the troubleshooting management pack sends the device snapshot to the device snapshot storage 310a in the mailbox 310 which, as discussed above, may be an administrator mailbox controlled by an administrator of the customer IHS 300. In another embodiment, a local device snapshot directory (e.g., in a managed system 304, 306, and/or 308) may be used to store the device snapshot before the device snapshot is sent to the mailbox 310. In an embodiment, device snapshots stored in the device snapshot storage 310a (or the local device snapshot directory) may be deleted from the device snapshot storage 310a after a predetermined amount of time (e.g., 7 days.)

The method 500 then proceeds to block 508 where the device snapshot is sent to a support IHS. The device snapshot communication engine 310b is operable to send the device snapshot created at block 504 of the method 500 over the network 202 to the support IHS 400. In an embodiment, the mailbox 310 may receive an message indicating that the failure was detected and that the device snapshot that was created in response to that detected failure is located in the device snapshot storage 310a, and the message may include an option to send the device snapshot to the support IHS 400 through the network 202 using the device snapshot communication engine 310b. In another embodiment, the device snapshot in the device snapshot storage 310a may be immediately sent through the network using the device snapshot communication engine 310b. While an administrator or other mailbox 310 has been described as storing and sending the device snapshot to the support IHS 400, one of skill in the art will recognize that the device snapshot storage and the device snapshot communication engine may be located outside of a mailbox or in another application without departing from the scope of the present disclosure.

Referring now to FIGS. 4, 5, and 7, the method 500 then proceeds to block 510 where the device snapshot is loaded into a virtual IHS. At block 508 of the method, the customer IHS re-creation engine 402 in the support IHS 400 receives the device snapshot, and at block 510 of the method 500 the customer IHS re-creation engine 402 creates a virtual customer IHS 404 and loads the received device snapshot of the customer IHS 300 into the virtual customer IHS 404. In an embodiment, the virtual IHSs 404a, 404b, and 404c corresponding to the managed systems 304, 306, and 308 are created when the device snapshot is loaded onto the virtual customer IHS 404. In an embodiment, the loading at block 510 is a relatively simple step that involves creating a virtual machine, installing all the deserializers on the virtual machine (WMI, Net SNMP agent/SNMP virtual MIB module, IIS/RACADM simulator, etc.), and copying the device snapshots at specific directories where the deserializers may read them, which results in a virtual machines that mimics the customer system.

In one example, the troubleshooting system 700 illustrated in FIG. 7 may be used to load the device snapshot into the virtual IHS. In the troubleshooting system 700, the support IHS customer IHS re-creation engine 706 is coupled to a support IHS management system 708 and a support IHS virtual IHS 710. In an embodiment, the support IHS management system 708 may be the management system 406 in the support IHS 400 described above with reference to FIG. 4, and the support IHS virtual IHS 710 may be one of the virtual IHSs 404*a*, 404*b*, or 404*c* in the virtual customer IHS 404 in the support IHS 400 described above with reference to FIG. 4. As discussed above, the support IHS management system 708 may be a physical management system, or the support IHS management system 708 may be a virtual management system created by the support IHS customer IHS re-creation engine 706. The support IHS management system 708 includes a server management pack 708*a*. The support IHS virtual IHS 710 is created by the customer IHS re-creation engine 706 and includes a management instrumentation command-line (MIC) 710*a* (e.g., a Windows® management instrumentation command line (WMIC)) coupled to management instrumentation 710*b* (e.g., a Windows® management instrumentation (WMI)) and virtual management instrumentation 710*c* (e.g., a virtual WMI). The MIC 710*a* is also coupled to a customer device MOF files database 710*d* and a management instrumentation error objects database 710*e* (e.g., Windows® management instrumentation (WMI) error objects). The support IHS virtual IHS 710 may be created by loading the management instrumentation state captured by the management instrumentation serializer 704*a* in the management system 704 onto the support IHS virtual IHS 710. For example, the snapshots captured by the serializer are in the standard format that is understood by the deserializer. The management instrumentation deserializer will then read the data files and MOF files containing all the information about the device such that the deserializer may recreate the inventory and health information for the device into a format which can be read by the management pack in the management system so as to reproduce the failure scenario as seen in the customer system.

In another example, the troubleshooting system 800 illustrated in FIG. 8 may be used to load the device snapshot into the virtual IHS. In the troubleshooting system 800, the support IHS customer IHS re-creation engine 806 is coupled to a support IHS management system 808 and a support IHS virtual IHS 810. In an embodiment, the support IHS management system 808 may be the management system 406 in the support IHS 400 described above with reference to FIG. 4, and the support IHS virtual IHS 810 may be one of the virtual IHSs 404*a*, 404*b*, or 404*c* in the virtual customer IHS 404 in the support IHS 400 described above with reference to FIG. 4. As discussed above, the support IHS management system 808 may be a physical management system, or the support IHS management system 808 may be a virtual management system created by the support IHS customer IHS re-creation engine 806. The support IHS management system 708 may include a printer management pack 808*a*, a storage system management pack 808*b*, and/or a CMC management pack 808*c*. The support IHS virtual IHS 810 is created by the customer IHS re-creation engine 806 and includes a net-SNMP agent 810*a* that is coupled to virtual management information base (MIB) modules 810*b* and an SNMP walks database 810*c*. The support IHS virtual IHS 810 also includes an Internet Information Server (IIS) 810*d* coupled to an RACADM simulator 810*e* and a RACADM command outputs database 810*f*. In one embodiment, the support IHS virtual IHS 810 may be created by loading the state captured from the SNMP walks generated by the SNMP serializer 804*a* onto the support IHS virtual IHS 810 (e.g., using the net SNMP agent with the virtual MIB modules 810*b* that read off MIB walks). For example, the device snapshot captured by the SNMP serializer is in the standardized format that is understood by the virtual MIB module. The Net SNMP agent loads the virtual MIB module that will read the device snapshot (e.g., SNMP walks saved in an XML format), which allows the virtual MIB module to recreate the inventory and health information for the device into the SNMP objects. Those SNMP objects may then be read by the SNMP management packs so as to reproduce the failure scenario as seen in the customer system. In another embodiment, a dummy RACADM protocol may be implemented using the RACADM simulator 810*e* and the RACADM command outputs database 810*f* to replicate the state of the customer managed system using the state of all commands saved by the RACADM serializer 804*c*. For example, the device snapshots captured by the RACADM serializer is in the standardized format understood by the RACADM simulator. The IIS loads the RACADM simulator that will read the device snapshot (e.g., the RACADM command outputs saved in XML format), which allows the RACADm simulator to recreate the inventory and health information for the device into RACADM objects. Those RACADM objects can them be read by the CMC management packs so as to reproduce the failure scenario as seen in the customer system.

Referring now to FIGS. 4 and 5, the method 500 then proceeds to block 512 where the virtual IHS is managed to replicate the failure of the customer IHS. The management system 406 in the support IHS 400 is used to manage the virtual customer IHS 404. Because the virtual customer IHSs 404 is created using a device snapshot taken from the managed systems 304, 306, and 308 in the customer IHS 300, the virtual IHSs 404*a*, 404*b*, and/or 404*c* are substantially identical in operation to the managed systems 304, 306, and 308, and the management of the virtual customer IHS 404 using the management system 406 will replicate the failure detected at block 502 of the method. The support IHS 400 may then use the replicated and reproduced customer IHS 300 in the virtual customer IHS 404 to troubleshoot the customer IHS 300 in order to analyze and/or diagnose the customer IHS 300 and determine the cause of the failure detected at block 502 of the method 500. The use of the device snapshot to create the virtual customer IHS 404 creates a virtual IHS that acts as a real device (i.e., the physical customer IHS 300), replicating the device state and error condition. One of skill in the art will recognize that the creation of the virtual customer IHS 404 using the device snapshot allows the state of the customer IHS 300 to be reproduced very quickly (almost immediately) and thus greatly accelerates the time necessary to allow troubleshooting of the problems occurring in the customer IHS 300. Furthermore, due to the device snapshot being taken automatically and immediately upon the detection of the failure, troubleshooting the customer IHS 300 is much more likely to allow accurate diagnosis of the cause of the failure relative to convention means, as the virtual IHS created using the immediately taken device snapshot will have the same state as the customer IHS 300 that produced the failure.

In an embodiment, the management system 302 and/or the managed systems 304, 306, and/or 308 in the customer IHS 300 may be operable to capture logs of the managed systems 304, 306, and/or 308 within a predetermined time of the failure (e.g., approximately 5 to 10 minutes prior to and subsequent to the failure) and send those logs along with any associated device snapshot that are created. The support IHS 400 may then use those logs to provide context for the failure that occurred in the customer IHS 300 in order to enhance the accuracy and/or time needed to troubleshoot the customer IHS 300.

Figure 9:
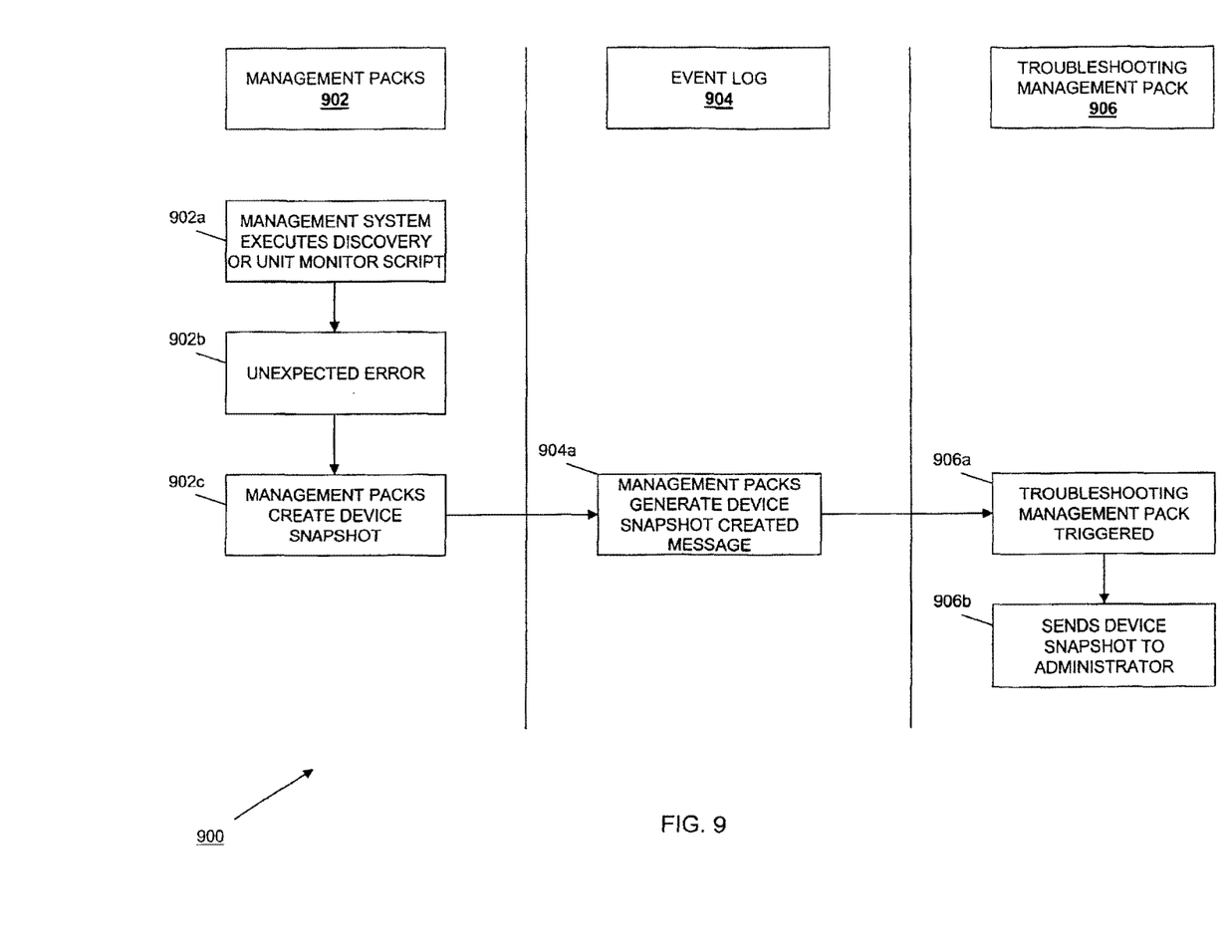
FIG. 9 is a use case illustrating an embodiment of a portion of the method of FIG. 5.

Referring now to FIGS. 3, 4, 5 and 9, an alternative embodiment of a portion of the method 500 for troubleshooting an IHS is illustrated. FIG. 9 illustrates a use case 900 that breaks the method 500 up into functionality that is carried out using management packs 902 on the management system 302 and managed systems 304, 306, and 308 on the customer IHS 300, an event log 904 (e.g., a Windows® event log) on the customer IHS 300, and a troubleshooting management pack 906 on the management system 302, in blocks 502, 504, and 506 of the method 500. The method 500 begins at block 502 where a failure is detected in a managed system in a customer IHS. In an embodiment, the SCOM on the management system 302 on the customer IHS 300 executes discovery, a unit monitor script, and/or other executables known in the art, at block 902*a*, and at block 902*b* an unexpected condition occurs (e.g., a management instrumentation collection error such as a Windows® management instrumentation (WMI) collection error.)

The method 500 then proceeds to block 504 where a device snapshot of the customer IHS is immediately triggered. In response to the unexpected condition at block 902*b*, the management pack(s) in the managed system(s) create a device snapshot for the customer IHS 300. As discussed above, the management packs provide device snapshot engines that create a device snapshot for the customer IHS 300. In an embodiment, block 504 of the method 500 is performed such that device snapshot engine(s) create a device snapshot of the customer IHS 300 at block 902*c* within 5 seconds of the unexpected condition being detected at block 602*b*. Thus, the 'immediate' triggering of the device snapshot of the customer IHS 300 at block 504 of the method 500 causes device snapshot of the customer IHS 300 to be created within a few seconds of the detected failure which, in experimental embodiments, has been found to provide a device snapshot of the customer IHS 300 that provides the exact configuration of the customer IHS 300 at the moment the failure occurred.

The method 500 then proceeds to block 506 where the device snapshot is stored in a device snapshot storage. After creating the device snapshot at block 902*c*, the management pack(s) in the managed system(s) generate a "device snapshot created" message in the event log 904 at block 904*a*. The "device snapshot created" message in the event log 904 triggers the troubleshooting management pack in the management server 302 at block 906*a*, and the troubleshooting management pack sends the device snapshot to a device snapshot storage at block 906*b*. The method 500 then proceeds at described above with reference to FIG. 5.

In another embodiment, device snapshots may be used for reproducing enterprise scale (e.g., very large and complex) customer IHS configurations (e.g., a customer IHS including servers with 100 storage device (or virtual devices)). In such an embodiment, when a user invokes a task on the managed system (e.g., 304, 306, and/or 308) in the customer IHS 400, the invoking of that task triggers the management pack(s) on the managed system(s) to create a device snapshot of the customer IHS 300. That device snapshot may then be transferred to the device snapshot storage 310*a* and sent to the support IHS 400 at any time to be loaded on a virtual IHS and used to troubleshoot problems with the customer IHS.

Thus, a system and method for troubleshooting an IHS are provided that, in response to detecting a failure in a managed system, automatically and immediately create a device snapshot of a customer IHS for use with a support IHS to create a virtual IHS that is substantially identical to the customer IHS in order to allow troubleshooting the customer IHS such that the cause of the failure may be diagnosed. The virtual IHS may be created very quickly relative to convention methods (e.g., compared to the use of logs that require determinations of the state of the device) and provide a virtual IHS in a state that is substantially identical to the customer IHS immediately following the failure, greatly increasing IHS troubleshooting time and accuracy. Furthermore, the device snapshots are created automatically, eliminating the need for an administrator of the customer IHS to reproduce the failure or unexpected condition, and the administrator may need only forward the device snapshot to a support IHS in order to have the failure diagnosed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS) troubleshooting system, comprising
   a customer IHS that is configured to be coupled to a network, wherein the customer IHS includes:
   a physical customer managed system;
   a customer management system that is coupled to the physical customer managed system and that is configured to detect a customer managed system failure in the physical customer managed system and, in response, immediately trigger a device snapshot of the physical customer managed system that includes the exact configuration of the physical customer managed system at the moment the customer managed system failure occurred, wherein the physical customer managed system is configured, in response to the customer management system triggering the device snapshot, to create the device snapshot that includes information that is configured to be provided in a virtual IHS in order to re-create the physical customer managed system and the customer managed system failure at the moment the customer managed system failure occurred; and
   a snapshot communication engine that is configured to send the device snapshot over the network.

2. The system of claim 1, wherein the physical customer managed system is configured to create the device snapshot within 5 seconds of the customer management system detecting the customer managed system failure.

3. The system of claim 1, wherein the customer managed system failure is associated with one or more components in the physical customer managed system, and wherein the device snapshot created by the physical customer managed system provides a state of the one or more components when the device snapshot was created.

4. The system of claim 1, wherein the customer managed system failure includes an unexpected condition.

5. The system of claim 1, wherein the customer management system is configured to:
   capture logs of the physical customer managed system before and after the detection of the customer managed system failure; and
   send the logs of the physical customer managed system over the network.

6. The system of claim 1, wherein the customer management system is configured to:
  detect, using a first management pack, the customer managed system failure and, in response, provide an indication of the customer managed system failure; and
  detect, using a second management pack, the indication of the customer managed system failure and, in response, trigger the device snapshot.

7. The system of claim 6, wherein the physical customer managed system is configured to detect the triggering of the device snapshot and, in response, create the device snapshot, and wherein the customer management system is configured to detect that the device snapshot was created and, in response, send the device snapshot over the network.

8. The system of claim 1, further comprising:
  a support IHS that is configured to be coupled to the customer IHS through the network, wherein the support IHS is configured to:
    receive the device snapshot over the network from the customer management system;
    load the device snapshot into a virtual IHS; and
    manage the virtual IHS such that the customer managed system failure that was detected by the customer management system is replicated for troubleshooting.

9. An information handling system (IHS), comprising
  a first processing system;
  a first memory system that is coupled to the first processing system and that includes instruction that, when executed by the first processing system, cause the first processing system to:
    detect a managed system failure in a physical managed system and, in response, immediately trigger a device snapshot of the physical managed system that includes the exact configuration of the physical managed system at the moment the managed system failure occurred;
    create, in response to the triggering of the device snapshot, the device snapshot that includes information that is configured to be provided in a virtual system in order to re-create the physical managed system and the managed system failure at the moment the managed system failure occurred; and
    send the device snapshot over a network.

10. The IHS of claim 9, wherein the device snapshot is created within 5 seconds of the detecting of the managed system failure.

11. The IHS of claim 9, wherein the managed system failure is associated with one or more components in the physical managed system, and wherein the device snapshot provides a state of the one or more components when the device snapshot was created.

12. The IHS of claim 9 wherein the managed system failure includes an unexpected condition.

13. The IHS of claim 9, wherein the first memory system includes instruction that, when executed by the first processing system, cause the first processing system to:
  capture logs of the physical managed system before and after the detection of the managed system failure; and
  send the logs of the physical managed system over the network.

14. The IHS of claim 9, wherein the first memory system includes a first management pack that, when executed by the first processing system, cause the first processing system to:
  detect the managed system failure and, in response, provide an indication of the managed system failure;
  wherein the first memory system includes a second management pack that, when executed by the first processing system, cause the first processing system to:
    detect the indication of the managed system failure and, in response, trigger the device snapshot; and
  wherein the first memory system includes a third management pack that, when executed by the first processing system, cause the first processing system to:
    detect that the device snapshot was created and, in response, send the device snapshot over the network.

15. The IHS of claim 9, further comprising:
  a second processing system;
  a second memory system that is coupled to the second processing system and that includes instruction that, when executed by the second processing system cause the second processing system to:
    receive the device snapshot over the network;
    load the device snapshot into a virtual system; and
    manage the virtual system such that the managed system failure that was detected is replicated for troubleshooting.

16. A method for troubleshooting an information handling system (IHS), comprising:
  detecting, by a management system, a managed system failure of a physical managed system and, in response, immediately trigger a device snapshot of the physical managed system that includes the exact configuration of the physical managed system at the moment the managed system failure occurred;
  creating, in response to the management system triggering the device snapshot, the device snapshot that includes information that is configured to be provided in a virtual system in order to re-create the physical managed system and the managed system failure at the moment the managed system failure occurred; and
  sending the device snapshot over a network.

17. The method of claim 16, wherein the device snapshot is created within 5 seconds of the detecting of the managed system failure.

18. The method of claim 16, wherein the managed system failure is associated with one or more components in the physical managed system, and wherein the device snapshot provides a state of the one or more components when the device snapshot was created.

19. The method of claim 16, further comprising:
  capturing logs of the physical managed system before and after the detection of the managed system failure; and
  sending the logs of the physical managed system over the network.

20. The method of claim 16, further comprising:
  receiving the device snapshot over the network;
  loading the device snapshot into a virtual system; and
  managing the virtual system such that the managed system failure that was detected is replicated for troubleshooting.

* * * * *